United States Patent
Rose

(10) Patent No.: US 6,529,487 B1
(45) Date of Patent: Mar. 4, 2003

(54) METHOD AND APPARATUS FOR SECURELY TRANSMITTING DISTRIBUTED RAND FOR USE IN MOBILE STATION AUTHENTICATION

(75) Inventor: Gregory G. Rose, Mortlake (AU)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/350,213

(22) Filed: Jul. 9, 1999

(51) Int. Cl.[7] .................................................. H04K 1/00
(52) U.S. Cl. ........................ 370/328; 370/319; 380/28; 713/170; 713/187; 713/201
(58) Field of Search ................................. 370/328, 319, 370/320, 324, 335, 342; 713/150, 170, 171, 176, 187, 200, 181, 201, 202; 380/9, 28, 29

(56) References Cited

U.S. PATENT DOCUMENTS

| | | | |
|---|---|---|---|
| 5,103,459 A | | 4/1992 | Gilhousen et al. .............. 375/1 |
| 5,450,395 A | * | 9/1995 | Hostetter et al. .............. 370/18 |
| 5,673,319 A | * | 9/1997 | Bellare et al. ................. 380/25 |
| 5,825,889 A | * | 10/1998 | Dent ............................ 380/49 |
| 5,872,847 A | * | 2/1999 | Boyle et al. .................. 380/25 |
| 6,028,933 A | * | 2/2000 | Heer et al. .................... 380/9 |

FOREIGN PATENT DOCUMENTS

| | | | |
|---|---|---|---|
| EP | 0768775 | 4/1997 | ............. H04L/9/32 |
| EP | 0872976 | 10/1998 | ............. H04L/9/22 |

* cited by examiner

Primary Examiner—Douglas Olms
Assistant Examiner—Shick Hom
(74) Attorney, Agent, or Firm—Philip R. Wadsworth; Kent D. BAker; Bruce W. Greenhaus

(57) ABSTRACT

A method and apparatus for generating and communicating random challenge values to mobile stations is disclosed that does not lose the unpredictability of a truly random number but can be simply and economically synchronized across cellular systems. The method and apparatus updates a binary number that will be used in cellular telephone system authentication procedures by applying a first algorithm to a plurality of most significant bits of a first binary number to obtain a second binary number; operates on a plurality of least significant bits of the first binary number with a second algorithm to obtain a third binary number, and applies a block cipher to the concatenation of the second and third numbers to obtain the updated binary number. When the most significant bits of the updated binary number comprise an all-zeroes number they are replaced with the most significant bits of the concatenation of the second and third numbers.

49 Claims, 4 Drawing Sheets

FIG. 5

FIXED BYTE SUBSTITUTION TABLE (501)

| | X0 | X1 | X2 | X3 | X4 | X5 | X6 | X7 | X8 | X9 | XA | XB | XC | XD | XE | XF |
|---|---|---|---|---|---|---|---|---|---|---|---|---|---|---|---|---|
| 0X | A3 | D7 | 09 | 83 | F8 | 48 | F6 | F4 | B3 | 21 | 15 | 78 | 99 | B1 | AF | F9 |
| 1X | C7 | 2D | 4D | 8A | CE | 4C | CA | 2E | 52 | 95 | D9 | 1E | 4E | 38 | 44 | 28 |
| 2X | 0A | DF | 02 | A0 | 17 | F1 | 60 | 68 | 12 | B7 | 7A | C3 | E9 | FA | 3D | 53 |
| 3X | 96 | 84 | 6B | BA | F2 | 63 | 9A | 19 | 7C | AE | E5 | F5 | F7 | 16 | 6A | A2 |
| 4X | 39 | B6 | 7B | 0F | C1 | 93 | 81 | 1B | EC | B4 | 1A | CA | D0 | 91 | 2F | B8 |
| 5X | 55 | B9 | DA | 85 | 3F | 41 | BF | C0 | 5A | 58 | 80 | 5F | 66 | 0B | D8 | 90 |
| 6X | 35 | D5 | C0 | A7 | 33 | 06 | 65 | 69 | 45 | 00 | 94 | 56 | 6D | 98 | 9B | 76 |
| 7X | 97 | FC | B2 | C2 | B0 | FE | DB | 20 | E1 | EB | D6 | E4 | DD | 47 | 4A | 1D |
| 8X | 42 | CD | 9C | 6C | 49 | 3C | CD | 43 | 27 | D2 | 07 | D4 | DE | C7 | 67 | 18 |
| 9X | 89 | CB | 30 | 1F | 8D | C6 | 8F | AA | C8 | 74 | DC | C9 | 5D | 5C | 31 | A4 |
| AX | 70 | 88 | 61 | 2C | 9F | 0D | 2B | 87 | 50 | 82 | 54 | 64 | 26 | 7D | 03 | 40 |
| BX | 34 | 4B | 1C | 73 | D1 | C4 | FD | 3B | CC | FB | 7F | AB | E6 | 3C | 5B | A5 |
| CX | AD | 04 | 23 | 9C | 14 | 51 | 22 | F0 | 29 | 79 | 71 | 7C | FF | 8C | 0C | C2 |
| DX | 0C | EF | BC | 72 | 75 | 6F | 37 | A1 | EC | D3 | 8E | 62 | 8B | 86 | 10 | E8 |
| EX | 08 | 77 | 11 | BC | 92 | 4F | 24 | C5 | 32 | 36 | 9D | CF | F3 | A6 | BB | AC |
| FX | 5C | 6C | A9 | 13 | 57 | 25 | B5 | C3 | BD | A8 | 3A | 01 | 05 | 59 | 2A | 46 |

METHOD AND APPARATUS FOR SECURELY TRANSMITTING DISTRIBUTED RAND FOR USE IN MOBILE STATION AUTHENTICATION

BACKGROUND

I. Field of the Invention

The present invention relates to digital telephone technology in general, and the authentication of mobile stations in cellular telephone systems in particular.

II. Description

The field of wireless communications has many applications including, for example, cordless telephones, paging, wireless local loops, and satellite communications systems. A particularly important application is cellular telephone systems for mobile subscribers. (As used herein, the term "cellular systems" includes both cellular and PCS frequencies.) Various over-the-air interfaces have been developed for such cellular telephone systems including, for example, frequency division multiple access (FDMA), time division multiple access (TDMA), and code division multiple access (CDMA). In connection therewith, various domestic and international standards have been established including, for example, Advanced Mobile Phone Service (AMPS), Global System for Mobile (GSM), and Interim Standard 95 (IS-95). In particular, IS-95 and its derivatives, IS-95A, ANSI J-STD-008, etc. (collectively referred to herein as IS-95), are promulgated by the Telecommunication Industry Association (TIA) and other well known standards bodies.

Cellular telephone systems configured in accordance with the IS-95 standard employ CDMA signal processing techniques. An exemplary cellular telephone system configured substantially in accordance with the IS-95 standard is described in U.S. Pat. No. 5,103,459, which is assigned to the assignee of the present invention and fully incorporated herein by reference. The aforesaid patent illustrates transmit, or forward-ink, signal processing in a CDMA base station. Exemplary receive, or reverse-link, signal processing in a CDMA base station is described in U.S. patent application Ser. No. 08/987,172, filed Dec. 9, 1997, entitled MULTI-CHANNEL DEMODULATOR, now abandoned, which is assigned to the assignee of the present invention and fully incorporated herein by reference.

In cellular telephone systems generally, mobile subscriber units, or mobile stations, must be authenticated by a base station. Authentication is the process by which information is exchanged between a mobile station and a base station for the purpose of confirming the identity of the mobile station. Cellular communications standards typically define procedures for authentication of mobile stations. Cellular standards published by the TIA provide two methods for authenticating mobile stations, the "unique challenge" method and the "broadcast challenge" method. TIA standards utilizing the foregoing authentication methods include, for example, IS-91 (an AMPS standard), IS-54 (a TDMA standard defining analog control channels), IS-136 (a TDMA standard defining digital control channels) and IS-95.

The unique challenge method is well known to those having skill in the art. In systems utilizing this method the cellular infrastructure (base station and/or base station controller) sends a challenge value to a mobile station, and the mobile station sends a response that is computed from the challenge, the mobile station identifier and secret data known only to the base station and the mobile station (assuming the mobile station is a legitimate mobile station). If the response is correct, the cellular infrastructure provides access to services such as telephone connections. The unique challenge method however has the disadvantage that the time required to complete the challenge-response process can be relatively long and unduly delay call setup. For this reason, the broadcast challenge method has been included in TIA cellular standards as a means of providing rapid authentication of requests for access to cellular services.

Under the broadcast challenge method of authentication, a challenge value (referred to in general as "RAND") is broadcast on a cellular control channel to mobile stations. The mobile stations store this challenge value when they receive them and subsequently use it, together with other stored information, when they request access to cellular services from the base station.

Authentication procedures are used by cellular telephone systems in a number of situations. For instance, base stations often require authentication of mobile station registrations, originations and terminations. Registration is the process by which a mobile station identifies its location and sends certain parameters to a base station. Origination procedures are instituted when a user directs the mobile station to initiate a call. Termination procedures are instituted when another party places a call to a mobile station, and the mobile station responds to a page message in order to accept the call.

In IS-95 configured CDMA systems, a mobile station will be authenticated only when the base station determines that both it and the mobile station possess identical sets of Shared Secret Data (SSD) and an identical Random Challenge Value (RCV). SSD is a 128-bit quantity that is known to both the base station and a mobile station, and is stored by the mobile station in its semi-permanent memory. The first 64 bits of SSD comprise the numerical value SSD A and the remaining 64 bits comprise the numerical value SSD B. SSD A is used in the authentication process, while SSD B is used in the voice privacy and message encryption processes. The RCV is a 32-bit number that corresponds to the challenge value used in the broadcast challenge method of authentication referred to above and will be discussed in more detail below. The 8 most significant bits of the RCV are sometimes referred to as RANDC, while the 24 least significant bits of the RCV are sometimes referred to as RANDL.

In the context of a mobile station origination in an IS-95 configured CDMA cellular telephone system, a typical mobile station authentication would be as follows. A user directs the mobile station to institute a telephone call. The mobile station determines whether the stored value of the authentication information element (AUTH) is set to "01," indicating that standard authentication mode should be used. If set to "01," the mobile station calculates the value of the Authentication Signature information element (AUTH SIGNATURE) in accordance with certain authentication algorithms described in "Common Cryptographic Algorithms," a publication available through the Telecommunications Industry Association but subject to restricted distribution. The AUTH_SIGNATURE input parameters and the values supplied by the mobile station for origination authentication would be as follows:

| RAND_CHALLENGE | ESN | AUTH_DATA | SSD_AUTH | SAVE_REGISTERS |
|---|---|---|---|---|
| $RAND_s$ | $ESN_p$ | DIGITS | SSD_A | TRUE | where $RAND_s$=Stored Random Challenge Memory, the stored value of the 32-bit Random Challenge Memory (RAND); $ESN_p$=Electronic Serial Number, a 32-bit value that uniquely identifies the mobile station stored in the permanent memory of the mobile station; and DIGITS=the encoded last six digits of the CHARi field in the mobile station Origination Message.

Once the mobile station calculates AUTH_SIGNATURE, the AUTHR field of the mobile station Origination Message is set to the value of AUTH_SIGNATURE, the RANDC field is set to the eight most significant bits of $RAND_s$ and the Origination Message is transmitted to the base station. The base station then computes the value of AUTHR in the same manner as the mobile station, using its internally stored value of SSD_A, compares this computed value with the value of AUTHR received from the mobile station, and compares the received value of RANDC to the eight most significant bits of its internally stored value of RAND. If the comparisons executed at the base station are successful, the base station will initiate the procedures used to assign the mobile station to various Traffic Channels. If either of the comparisons fail, the base station may deny service, initiate the Unique Challenge-Response Procedure or commence the SSD Update Procedure.

In typical cellular telephone systems the available frequency spectrum is divided into a number of channels, each of which is used for different purposes. In IS-95 configured CDMA systems, one of those channels is the Paging Channel. The Paging Channel is an encoded, interleaved, spread, and modulated spread spectrum signal that base stations use to transmit system overhead information and mobile station specific messages to mobile stations that have not been assigned to a Traffic Channel. One of the messages transmitted on the Paging Channel and monitored by mobile stations is the Access Parameters Message. The Access Parameters Message is a variable length message having twenty-seven fields, including the Authentication Mode (AUTH) and RAND fields. The AUTH field is a 2-bit field whose value is set to "01" by a base station if mobile stations are to include standard authentication data in Access Channel messages sent to that base station. If mobile stations should not include standard authentication data in Access Channel messages, the base station will set the value of the AUTH field to "00." The RAND field is a 0- or 32-bit field whose value is set to the 32-bit RCV that mobile stations are to use in the authentication procedures when the AUTH field has been set to "01." Base stations set the value of RAND in the CDMA Access Parameters Message equal to the concatenation of the 16-bit RAND1_A and RAND1_B overhead information words periodically appended to the System Parameter Overhead Messages transmitted by base stations to mobile stations on the analog Forward Control Channel.

In CDMA systems, the RCV is intended to be a random 32-bit number so that it will not repeat for approximately 8000 years. The 8000 years before repeat property is an important security feature, rendering it essentially impossible for an attacker to predict what the RCV will be at any point in the future. For a number of reasons, it has been found that it is advantageous to change the RCV used in the authentication process frequently, potentially every minute.

Changing the RCV every minute however, introduces the problem that duplicate values of the RCV will begin appearing after approximately $2^{16}$ minutes (about 45 days) if the RCV is generated truly at random. It has also been found that there are certain advantages to be gained by synchronizing the RCV across cellular systems. Communicating the RCV throughout the network of cellular systems; however, which would be required if the synchronized RCV were truly random, would be difficult and expensive.

It has therefore been proposed in U.S. patent application Ser. No. 09/036,941, filed Mar. 9, 1998, entitled METHOD FOR GENERATING A BROADCAST CHALLENGE VALUE, now U.S. Pat. No. 6,285,873 issued Sep. 4, 2001, which is assigned to the assignee of the present invention and fully incorporated herein by reference, to utilize a combination of maximal-length linear feedback shift registers (LFSRs) based counters in base stations to generate the 32-bit RCV. The combination of maximal-length LFSR based counters will not generate a repeat RCV for approximately $2^{32}-2^{24}$ minutes (about 8000 years), and will never generate an RCV with a zero leading octet. Having a non-zero leading octet is important because only the eight most significant bits of RANDs are utilized in a number of authentication operations. Synchronizing the RCV across cellular systems is simple and inexpensive with an LFSR based counter as well. Any base station in the system may calculate the proper RCV for any particular time given a starting position, the number of minutes that have elapsed since that starting position and a global time reference. As discussed more fully in U.S. Pat. No. 6,285,873 incorporated by reference above, using GPS system time as the global time reference is preferred.

There are however drawbacks to the use of an LFSR based counter to generate the RCV. Specifically, using an LFSR based counter results in the loss of RCV unpredictability. By observing only an hour or so of the RCVs generated by a base station with an LFSR based counter and transmitted to the mobile stations in the Access Parameters Message, an attacker may be able to derive and understand the formula used by the LFSR based counter. Having derived the formula, the attacker could then predict the RCV for any given time in the future.

Hence, there is a need for a secure method of generating and communicating the RCV to mobile stations that does not lose the unpredictability of a truly random number but can be simply and economically synchronized across cellular telephone systems.

SUMMARY

The present invention is directed to a method and apparatus for generating and communicating random challenge values to mobile stations that does not lose the unpredictability of a truly random number but can be simply and economically synchronized across cellular systems. The invention comprises a method and apparatus for updating a binary number to be used in cellular telephone system authentication procedures, that applies a first algorithm to a plurality of most significant bits of a first binary number to obtain a second binary number; operates on a plurality of least significant bits of the first binary number with a second algorithm to obtain a third binary number, and applies a block cipher to the concatenation of the second and third numbers to obtain the updated binary number. In a particular embodiment of the invention, the block cipher comprises a modified version of the SKIPJACK block cipher encryption function. In yet another embodiment of the invention, when the most significant bits of the updated binary number comprise an all-zeroes number they are replaced with the most significant bits of the concatenation of the second and third numbers.

BRIEF DESCRIPTION OF THE DRAWINGS

The features, objects and advantages of the present invention will become more apparent from the detailed description set forth below when taken in conjunction with the drawings, in which like reference characters identify correspondingly throughout and wherein:

FIG. 5 shows the F-table for the SKIPJACK block cipher.

DETAILED DESCRIPTION

According to the present invention, the problem of generating and transmitting a RCV to a mobile station that does not lose the unpredictability of a truly random number, but can be simply and economically synchronized across cellular telephone systems, is solved through the use of LFSRs and a block cipher encryption function. Specifically, a block cipher encryption function, whose key is kept relatively secret in the cellular telephone base stations, is used to encrypt the RCV generated by an LFSR based counter, a combination of LFSR based counters or even a simple counter before the RCV is transmitted to a mobile station. Because block cipher encryption functions are one-to-one functions, for every distinct input the block cipher encryption function output will be distinct as well, thereby preserving the property of 8000 years before a repeat of RCVs generated with an LFSR based counter. Moreover, without access to the block cipher encryption key, an attacker will be unable to predict the RCV at any particular time while the ability to simply and economically synchronize the RCV across cellular telephone systems is retained. Any block cipher encryption function that will operate on a 32-bit block and that is reasonably secure may be used. In a preferred embodiment of the invention, a modified version of the SKIPJACK block cipher is utilized as the block cipher encryption function.

In some cellular telephone applications it is unacceptable for the first byte of an information element to have a value of zero. The use of a block cipher encryption function to encrypt the RCV generated by a base station with an LFSR based or simple counter will, however, result in the encrypted RCV having a first byte with a value of zero with a probability of about $2^{-8}$ because the output of the encryption function will appear truly random. Therefore, in another embodiment of the present invention, the first byte of the encrypted RCV output is replaced with the first byte of the unencrypted RCV input whenever the first byte of the output has a value of zero. This eliminates the problem of having an encrypted RCV whose first byte has a value of zero. Thus, even though replacing the first byte of the encrypted RCV output with the first byte of the unencrypted RCV input will necessarily mean that the encrypted RCV output will duplicate another encrypted RCV output at some point in time, it will do so in an unpredictable fashion.

As will be understood by those having ordinary skill in the art, various methods and apparati for generating and transmitting numbers to be used in mobile station authentication embodying features of the present invention may reside in any of the various cellular telephone systems. Such cellular systems include, by way of example only, AMPS (analog), IS-54 (North American TDMA), GSM (worldwide TDMA), and IS-95 (North American CDMA). In a preferred embodiment, the cellular system is a spread spectrum CDMA cellular telephone system.

Figure 1:
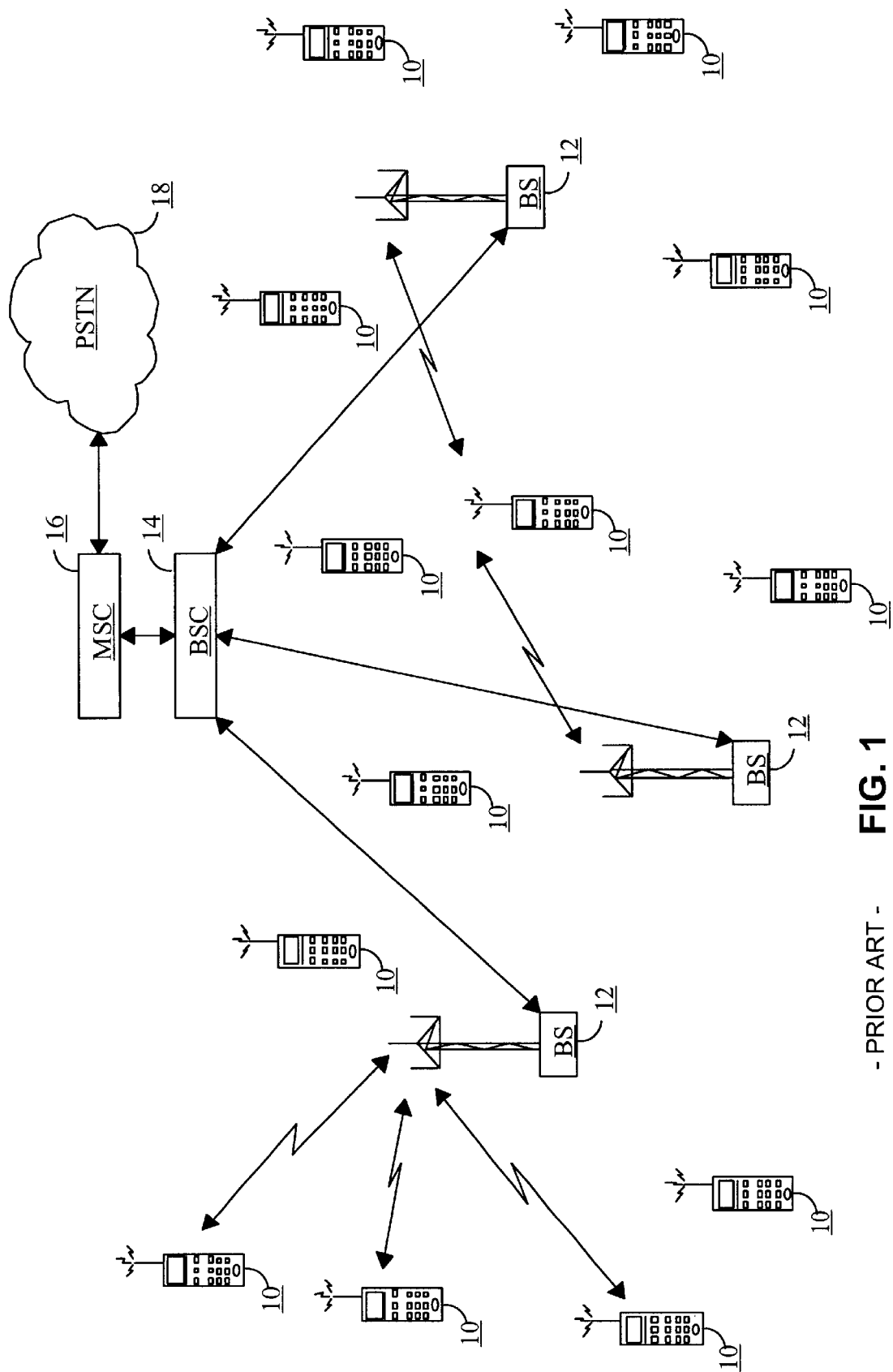
FIG. 1 is a diagram of a cellular telephone system.

Referring now to FIG. 1, there is shown a block diagram of a typical CDMA cellular telephone system. Such systems generally include a plurality of mobile subscriber units 10, a plurality of base stations (BS) 12, a base station controller (BSC) 14, and a mobile switching center (MSC) 16. The MSC 16 is configured to interface with a conventional public switch telephone network (PSTN) 18. The MSC 16 is also configured to interface with the BSC 14. The BSC 14 is coupled to each base station 12. The base stations 12 may also be known as base station transceiver subsystems (BTSs) 12. Alternatively, "base station" may refer collectively to a BSC 14 and one or more BTSs 12, which BTSs 12 may also be referred to as "cell sites" 12. (Alternatively, sectors of a given BTS 12 may be referred to as cell sites.) The mobile subscriber units 10 are typically cellular telephones 10, and the cellular telephone system is, for example, a spread spectrum CDMA system configured for use in accordance with the IS-95 standard.

During typical operation of the cellular telephone system, the base stations 12 receive sets of reverse link signals from sets of mobile units 10. The mobile units 10 are conducting telephone calls or other communications. Each reverse link signal received by a given base station 12 is processed within that base station 12. The resulting data is forwarded to the BSC 14. The BSC 14 provides call resource allocation and mobility management functionality, including the orchestration of soft handoffs between base stations 12. The BSC 14 also routes the received data to the MSC 16, which provides additional routing services for interface with the PSTN 18. Similarly, the PSTN 18 interfaces with the MSC 16 and the MSC 16 interfaces with the BSC 14, which in turn controls the base stations 12 sets of forward link signals to sets of mobile units 10. In the CDMA system of FIG. 1, each base station 12 includes at least one sector (not shown), each sector comprising an antenna pointed in a particular direction radially away from the base station 12. Preferably, each base station 12 includes three sectors wherein the axis of each sector antenna differs by approximately 120 degrees.

Advantageously, LFSRs or software simulations thereof may be used by the base stations 12 to generate the RCVs that are eventually transmitted to the mobile stations for use in the mobile station authentication procedures. In IS-95 configured CDMA systems, the RCVs are transmitted to the mobile stations in the RAND field of the Access Parameters Message. In a preferred embodiment of the present invention, the LFSRs are maximal-length shift registers; and more specifically, Galois shift registers. Other implementations of maximal-length shift registers may however be utilized. As would be known in the art, maximal-length shift registers are LFSRs that have been configured to ensure that their characteristic polynomials are both irreducible and primitive, thereby resulting in a sequence having a period $(P)=2^r-1$, where r is the number of bit positions in the LFSR.

Figure 2:
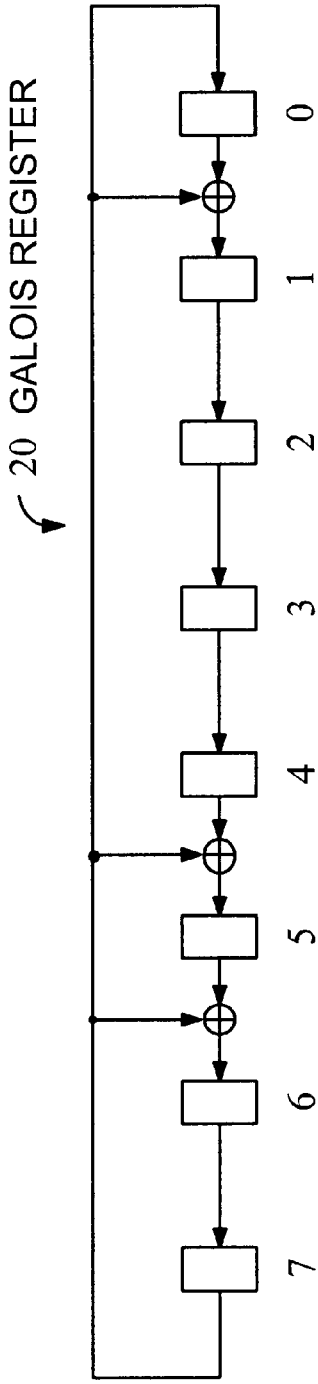
FIG. 2 is a block diagram of a Galois shift register.

Referring now to FIG. 2, there is shown an 8-bit Galois shift register 20 having feedback taps after bit positions 0, 4 and 5. As understood by those having skill in the art, a Galois shift register shifts each register bit one position to the left with each clock pulse, and certain register bits are logically combined in an exclusive-or (XOR) relationship with a feedback bit. For example, upon each shift left, bit position 1 receives the XOR result of bit 7 and bit 0. Similarly, bit position 5 receives the XOR result of bit 7 and bit 5.

Figure 3:
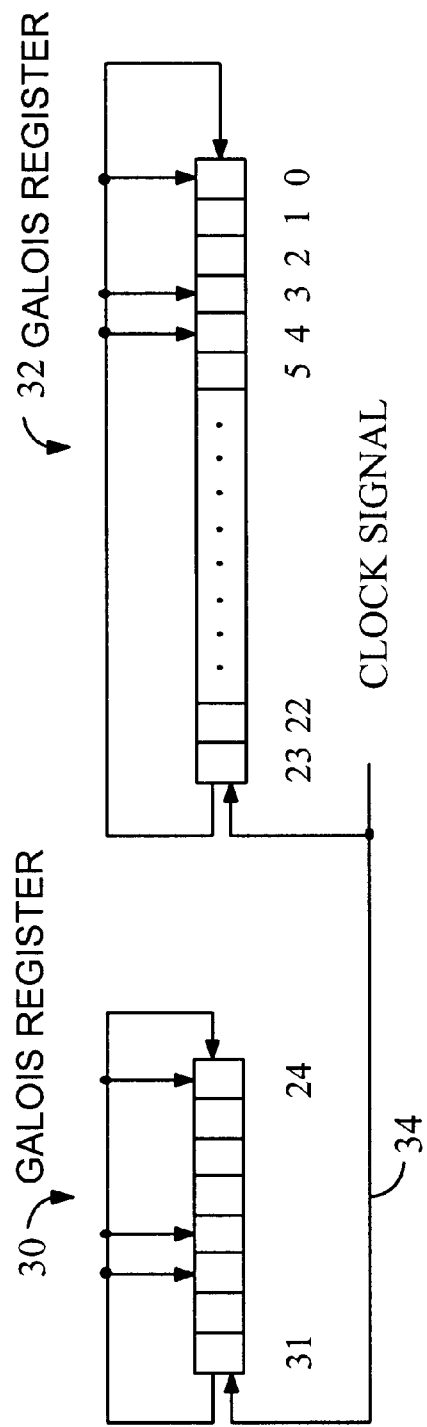
FIG. 3 is a block diagram of two Galois shift registers.

Referring now to FIG. 3, there is shown a preferred method of generating the number to be operated upon in the present invention. The method relies upon first and second Galois shift registers 30, 32. A single update clock signal 34 causes an update of the two Galois shift registers 30, 32. The first register 30 is an 8-bit Galois shift register 30 used to create the eight most significant bits of the RCV. The second shift register 32 is a 24-bit Galois shift register 32 used to create the remaining bits of the 32-bit RCV. The first and second shift registers 30, 32 are both coupled to the clock signal 34, but are otherwise unconnected.

Referring still to FIG. 3, first and second shift registers 30, 32 each have feedback taps, or electrical connections, applied to particular bit locations. As would be understood by those skilled in the art any primitive polynomials of order eight and twenty-four can be used to determine, respectively, the feedback taps of the first and second shift registers 30, 32. As shown in FIG. 3, first and second shift registers have the following primitive polynomials $x^8+x^6+x^5+x+1$ and $x^{24}x^4+x^3x+1$, respectively. Provided each shift register 30, 32 is initialized to a non-zero value, the sequences each shift register 30, 32 generates will always be non-zero as well. Thus, the eight most significant bits (i.e., each number generated by shift register 30) of each number in the sequence will be non-zero. This arrangement of first and second shift registers 30, 32 does not however, result in the 32-bit output sequence having the maximum P of $2^{32}-1$ that would be possible with a single maximal-length LFSR with 32 bit positions because first and second shift registers 30, 32 produce sequence lengths that are not relatively prime. First shift register 30 produces a sequence with a P of $2^8-1=255=3*5*17$, while second shift register 32 produces a sequence with a P of $2^{24}-1=16777215=3*3*5*7*13*17*241$. Thus, the P of the sequence generated by first and second shift registers 30, 32 is 65793, only slightly greater than that the P of a single 16-bit maximal-length LFSR. However, because the sequence produced by a maximal-length LFSR has no all-zeroes value, and the condition of having no all-zeroes value is important with respect to the eight most significant bits of the RCV only, the P of the sequence generated by first and second shift registers 30, 32 may be extended by inserting an all-zeroes value at any point in the sequence generated by 24-bit shift register 32. In so doing, the P of second shift register 32 is increased from 16777215 to 16777216, which is a power of 2 and relatively prime to the P of first shift register 30 (255). Accordingly, with the all-zeroes value placed at some point in the sequence generated by second shift register 32, the P of the 32-bit sequence generated by first and second shift registers 30, 32 becomes the maximal-length sequence where the eight most significant bits must be non-zero, or $2^{32}-2^{24}$ in length.

Having generated the number to be operated upon as described above, a block cipher encryption function (a "block cipher") is applied to the number. A block cipher is a function E which maps n-bit plaintext blocks P to n-bit ciphertext blocks C, where n is the length of the block. It may be viewed as a simple substitution cipher with large character size. The block cipher is parameterized by a k-bit key K, taking values from a subset Q (typically referred to as the key space) of the set of all k-bit vectors $V_k$. For an n-bit P, an n-bit C and a fixed key K, the block cipher is a bijection, defining a permutation on n-bit vectors. Each key potentially defines a different bijection. It is generally assumed that the key is chosen at random. In other words, an n-bit block cipher is a function E: $V_n \times Q \rightarrow V_n$, such that for each key $K \subset Q$, E(P, K) is an invertible mapping (the encryption function for K) from $V_n$ to $V_n$, written $E_K(P)$. The inverse mapping is the decryption function, denoted $D_K(C)$ or $E_K^{-1}$. $C = E_K(P)$, the ciphertext that results from encrypting plaintext P under key K.

There are a number of known block ciphers designed to operate on data blocks having 64 (or more) bits. The most well-known of these block ciphers is the Data Encryption Standard (DES) defined by the American standard FIPS 46-2. The Codebook Encryptor/Decryptor Algorithm (SKIPJACK) is another symmetric-key block cipher designed to operate on a block size of 64 bits and is defined by the American standard FIPS 185. FIPS 185 may be retrieved at http://www.itl.nist.gov/fipspubs/fip185.htm/ and the specification for SKIPJACK may be viewed at http://csrc.nist.gov/encryption/skipjack-1.pdf/ and http://csrc.nist.gov/encryption/skipjack-2.pdf/, both of which are incorporated fully herein by reference. The SKIPJACK block cipher, like the DES, is a Feistel cipher which processes plaintext blocks of n=64 bits, producing 64-bit ciphertext blocks. The effective size of the secret key K is 80 bits, and the $2^{80}$ keys implement (at most) $2^{80}$ of the $2^{64}!$ possible bijections on the 64-bit plaintext blocks.

Figure 4:
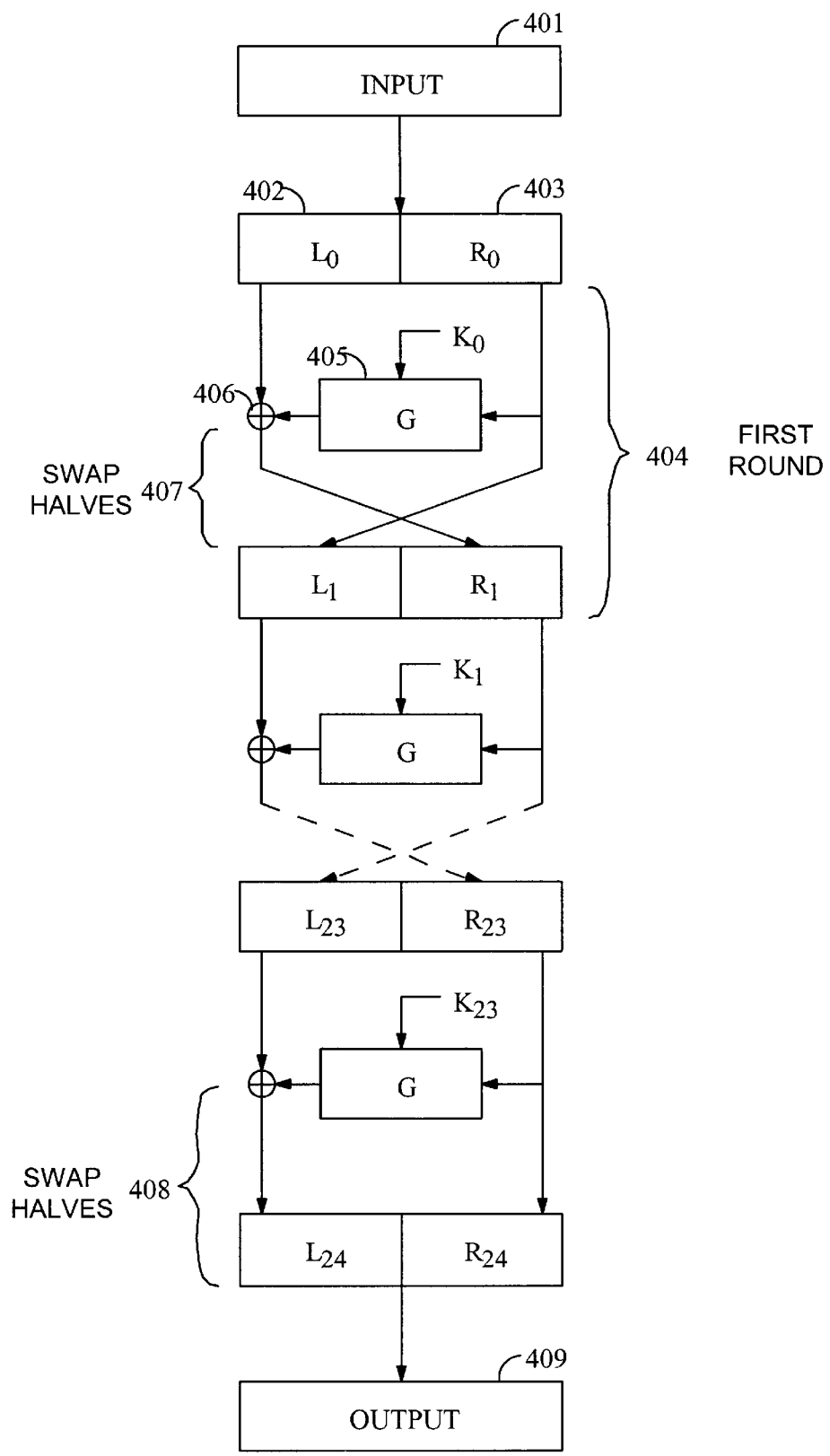
FIG. 4 shows the computation path of the modified SKIPJACK block cipher.

SKIPJACK can however be modified to operate on 32-bit blocks utilizing the same key-dependent permutation G and F-table as the full SKIPJACK block cipher, and the Feistel structure of the DES block cipher rather than the four component structure of the unmodified SKIPJACK block cipher. The computation path of the modified SKIPJACK is shown in FIG. 4. First, the 32-bit input block 401 is split into two equal halves $L_0$ 402 and $R_0$ 403, each having 16-bits. Having split the 32-bit input block into halves, encryption now proceeds in 24 rounds. In the first or $0^{th}$ round 404, key-dependent permutation G 405 is applied to $R_0$ 403, the output of which is then combined with the round number (in this case 0) and $L_0$ 402 in an XOR operation 406. The two halves are then swapped 407, completing the first round, and the same operation is repeated for another 23 rounds. Following the $24^{th}$ and final round, the halves are swapped again 408. The output 409 is the RCV used in the authentication procedures referred to above, unless the most significant bits of output 409 comprise an all-zeroes value. In this case, in a preferred embodiment of the invention, the most significant bits of input 401 are substituted for the most significant bits of output 409 before output 409 is used as the RCV.

Key-dependent permutation G 405 is a four-round Feistel structure that permutes 16-bit values (i.e., words) on $V_{16}$, the set of all 16bit values. The round function is a fixed byte-substitution table (i.e., a permutation on $V_8$, the set all of 8-bit values) called the F-table and depicted in FIG. 5 as 501. Each entry in the table is given in hexadecimal notation. The high order 4 bits of the input index the row 502 and the low order 4 bits of the input index the column 503. For example, an input of 7a would permute to d6 504. Each round of G 405 also incorporates a byte of key K. The per-round functions of G 405 may be characterized as:

$$G_k(w=g_1||g_2)=g_5||g_6,$$

where $g_i=F(g_{i-1} \oplus cv_{4k+i-3}) \oplus g_{i-2}$, k is the step number, F is the SKIPJACK F-table 501, and $cv_{4k+i-3}$ is the (4k+i−3)th byte in the schedule of key K. Thus, $g_3 = F(g_2 \oplus cv_{4k}) \oplus g_1$ $g_4 = F(g_3 \oplus cv_{4k+1}) \oplus g_2$ $g_5 = F(g_4 \oplus cv_{4k+2}) \oplus g_3$ $g_6 = F(g_5 \oplus cv_{4k+2}) \oplus g_4$.

The schedule of key K is 10 bytes long (i.e., 80 bits), labelled 0 through 9, and is used in its natural order. The schedule subscripts noted above are therefore to be interpreted mod-10.

A pseudo-code version of the modified SKIPJACK block cipher encryption process is shown in Table 1 below:

TABLE 1

```
typedef unsigned char    BYTE;/*8 bits*/
typedef unsigned short   WORD;/*16 bits*/
const BYTE ftable[256] = {
0xa3,0xd7,0x09,0x83,0xf8,0x48,0xf6,0xf4,0xb3,0x21,0x15,0x78,0x99,0xb1,0xaf,0xf9,
0xe7,0x2d,0x4d,0x8a,0xce,0x4c,0xca,0x2e,0x52,0x95,0xd9,0x1e,0x4e,0x38,0x44,0x28,
0x0a,0xdf,0x02,0xa0,0x17,0xf1,0x60,0x68,0x12,0xb7,0x7a,0xc3,0xe9,0xfa,0x3d,0x53,
0x96,0x84,0x6b,0xba,0xf2,0x63,0x9a,0x19,0x7c,0xae,0xe5,0xf5,0xf7,0x16,0x6a,0xa2,
0x39,0xb6,0x7b,0x0f,0xc1,0x93,0x81,0x1b,0xee,0xb4,0x1a,0xea,0xd0,0x91,0x2f,0xb8,
0x55,0xb9,0xda,0x85,0x3f,0x41,0xbf,0xe0,0x5a,0x58,0x80,0x5f,0x66,0x0b,0xd8,0x90,
0x35,0xd5,0xc0,0xa7,0x33,0x06,0x65,0x69,0x45,0x00,0x94,0x56,0x6d,0x98,0x9b,0x76,
0x97,0xfc,0xb2,0xc2,0xb0,0xfe,0xdb,0x20,0xe1,0xeb,0xd6,0xe4,0xdd,0x47,0x4a,0x1d,
0x42,0xed,0x9e,0x6e,0x49,0x3c,0xcd,0x43,0x27,0xd2,0x07,0xd4,0xde,0xc7,0x67,0x18,
0x89,0xcb,0x30,0x1f,0x8d,0xc6,0x8f,0xaa,0xc8,0x74,0xdc,0xc9,0x5d,0x5c,0x31,0xa4,
0x70,0x88,0x61,0x2c,0x9f,0x0d,0x2b,0x87,0x50,0x82,0x54,0x64,0x26,0x7d,0x03,0x40,
0x34,0x4b,0x1c,0x73,0xd1,0xc4,0xfd,0x3b,0xcc,0xfb,0x7f,0xab,0xe6,0x3e,0x5b,0xa5,
0xad,0x04,0x23,0x9c,0x14,0x51,0x22,0xf0,0x29,0x79,0x71,0x7e,0xff,0x8c,0x0e,0xe2,
0x0c,0xef,0xbc,0x72,0x75,0x6f,0x37,0xa1,0xec,0xd3,0x8e,0x62,0x8b,0x86,0x10,0xe8,
0x08,0x77,0x11,0xbe,0x92,0x4f,0x24,0xc5,0x32,0x36,0x9d,0xcf,0xf3,0xa6,0xbb,0xac,
0x5e,0x6c,0xa9,0x13,0x57,0x25,0xb5,0xe3,0xbd,0xa8,0x3a,0x01,0x05,0x59,0x2a,0x46,
};
WORD
g(BYTE *key, int k, WORD w)
{
        BYTE g1, g2, g3, g4, g5, g6;
        g1 = (w>>8)&0xff;
        g2 = w&0xff;
        g3 = ftable[g2 ^ key[(4*k)%10]] ^ g1;
        g4 = ftable[g3 ^ key[(4*k+1)%10]] ^ g2;
        g5 = ftable[g4 ^ key[(4*k+2)%10]] ^ g3;
        g6 = ftable[g5 ^ key[(4*k+3)%10]] ^ g4;
        return ((g5<<8) + g6);
}
void
skip32(BYTE key[10], BYTE buf[4], int encrypt)
{
        int     k; /*round number*/
        int     i; /*round counter*/
        int     kstep;
        WORD    wl, wr;
        /* sort out direction*/
        if (encrypt)
                kstep = 1, k = 0;
        else
                kstep = -1, k = 23;
        /*pack into words*/
        wl = (buf[0] << 8) + buf[1];
        wr = (buf[2] << 8) + buf[3];
        /*24 feistel rounds, doubled up*/
        for (i = 0; i < 24/2; ++i) {
                wr ^= g(key, k, wl) ^ k;
                k += kstep;
                wl ^= g(key, k, wr) ^ k;
                k += kstep;
        }
        /*implicitly swap haves while unpacking*/
        buf[0] = wr >> 8; buf[1] = wr & 0xFF;
        buf[2] = wl >> 8; buf[3] = wl & 0xFF;
}
#include <stdio.h>
int main(int ac, char *av[])
{
        BYTE in[4] = { 0x33,0x22,0x11,0x00 };
        BYTE key[10]= { 0x00,0x99,0x88,0x77,0x66,0x55,0x44,0x33,0x22,0x11 };
        int     i, encrypt;
        int     bt;
        if (ac == 1) {
                skip32(key, in, 1);
                printf("%02x%02x%02x%02x\n", in[0], in[1], in[2], in[3]);
                if (in[0] != 0x81 || in[1] != 0x9d || in[2] != 0x5f || in[3] != 0x1f) {
                        printf("819d5f1f is the answer! Didn't encrypt correctly!\n");
```

TABLE 1-continued

```
            return 1;
        }
        skip32(key, in, 0);
        if (in[0] != 0x33 || in[1] != 0x22 || in[2] != 0x11 || in[3] != 0x00) {
            printf("%02x%02x%02x%02x\n", in[0], in[1], in[2], in[3]);
            printf("33221100 is the answer! Didn't decrypt correctly!\n");
            return 1;
        }
    }
    else if (ac != 4) {
        fprintf(stderr, "usage: %s e/d kkkkkkkkkkkkkkkkkkkk dddddddd/ n", av[0]);
        return 1;
    }
    else {
        encrypt = av[1][0] == 'e';
        for (i = 0; i < 10; ++i) {
            sscanf(&av[2][i*2], "%02x", &bt);
            key[i] = bt;
        }
        for (i = 0; i < 4; ++i) {
            sscanf(&av[3][i*2], "%02x", &bt);
            in[i] = bt;
        }
        skip32(key, in, encrypt);
        printf("%02x%02x%02x%02x\n", in[0], in[1], in[2], in[3]);
    }
    return 0;
}
```

The generation of an RCV as described above can be implemented with any conventional source code including, for example, C code, C++ code, as will be understood by those having skill in the art. Cellular sites typically include integrated circuits, which are advantageously Application Specific Integrated Circuits (ASICs), with microprocessors running software. It can therefore be appreciated that the invention is simple enough to be performed anywhere in the infrastructure of a cellular system. In a specific embodiment, the invention can be implemented in cell sites (not shown) of the CDMA cellular system of FIG. 1, thereby eliminating the need to create new RCVs centrally and distribute them to cell sites throughout the system for broadcast.

As those skilled in the art will readily appreciate, any similar form of pseudorandom noise generator may be substituted for the maximal-length shift registers in the embodiments described herein. Further, while the embodiments described herein pertain to cellular telephone systems, including CDMA systems, in which the eight most significant bits of the RCV, RANDC, are constrained to be non-zero, it should be understood that RANDC need not be non-zero unless the particular system so specifies. Accordingly, depending upon the constraints of the system either RANDC or RANDL, or both, could have an all-zeroes value inserted to extend the period of either or both of the sequences. Moreover, the cellular system broadcast challenge value of the embodiments described herein could equally well be any binary number that requires periodic updates such that correlation between successive updates is minimized and the number of updates before which a repeat value occurs is maximized.

Preferred embodiments of the present invention have thus been shown and described. It will be apparent to one having ordinary skill in the art however, that numerous alterations may be made to the embodiments herein disclosed without departing from the spirit or scope of the invention. Therefore, the present invention is not to be limited except in accordance with the following claims.

I claim:

1. A method comprising:

applying a first algorithm to a plurality of most significant bits of a first binary number to obtain a second binary number;

operating on a plurality of least significant bits of said first binary number with a second algorithm to obtain a third binary number;

applying a block cipher to the concatenation of said second and third numbers to obtain said updated binary number, wherein applying the block cipher to the concatenation of said second and third numbers comprises, applying the block cipher to said concatenation to obtain an encrypted binary number;

determining whether the most significant bits of said encrypted number has an all-zeroes value; and replacing, in response to said all-zeroes value, said most significant bits of said encrypted number with said most significant bits of said concatenation to obtain said updated binary number; and applying said updated binary number in cellular telephone system authentication procedures.

2. The method of claim 1 wherein applying the first algorithm comprises applying a first maximal-length shift register algorithm.

3. The method of claim 1 wherein applying the first algorithm comprises applying first pseudorandom noise generation algorithm.

4. The method of claim 1 wherein operating on the plurality of least significant bits of said first binary number with the second algorithm comprises operating on said plurality of least significant bits with a second maximal-length shift register algorithm.

5. The method of claim 1 wherein operating on the plurality of least significant bits of said first binary number with the second algorithm comprises operating on said plurality of least significant bits with a second pseudorandom noise generation algorithm.

6. The method of claim 1 wherein operating on the plurality of least significant bits of said first binary number with the second algorithm further comprises inserting an all-zeroes value for said plurality of least significant bits once during the period of time necessary for the sequence of updates to produce a repeat value for said plurality of least significant bits.

7. The method of claim 1 wherein the output of said first algorithm is never an all-zeroes value.

8. The method of claim 1 wherein said most significant bits of said first binary number comprise the first 8 bits of said first binary number.

9. The method of claim 1 wherein said updated binary number is a 32-bit binary number.

10. The method of claim 9 wherein said block cipher comprises a modified SKIPJACK block cipher.

11. A cellular base station, comprising:
   an integrated circuit capable of running software; and
   a set of software instructions executed by said integrated circuit for applying a first algorithm to a plurality of most significant bits of a first binary number to obtain a second binary number, for applying a second algorithm to a plurality of least significant bits of said first binary number to obtain a third binary number, and for applying a block cipher to a fourth binary number, said fourth binary number comprising the concatenation of said second and third binary numbers, wherein said first algorithm comprises a first simulated maximal-length shift register algorithm.

12. The base station of claim 11 wherein said second algorithm comprises a second simulated maximal-length shift register algorithm.

13. The base station of claim 11 wherein said second algorithm comprises a second pseudorandom noise generation algorithm.

14. The base station of claim 11 wherein said second algorithm inserts an all-zeroes value for said plurality of least significant bits once during the period of time necessary for the sequence of updates to produce a repeat value for said plurality of least significant bits.

15. The base station of claim 11 wherein the output of said first algorithm is never an all-zeroes value.

16. The base station of claim 11 wherein said most significant bits of said first binary number comprise the first 8 bits of said first binary number.

17. The base station of claim 11 wherein said fourth binary number is a 32-bit binary number.

18. The base station of claim 17 wherein said block cipher comprises a modified SKIPJACK block cipher.

19. The base station of claim 11 wherein said set of software instructions replace the most significant bits of said fourth binary number with the most significant bits of said concatenation when said most significant bits of said fourth binary number has an all-zeroes value.

20. A cellular system, comprising:
   a system-wide time reference signal;
   a plurality of mobile subscriber units; and
   a plurality of base stations configured for wireless communication with said plurality of mobile subscriber units, each of said plurality of base stations comprising:
      an integrated circuit capable of running software; and
      a set of software instructions executed by said integrated circuit for applying a first algorithm to a plurality of most significant bits of a first binary number to obtain a second binary number, for applying a second algorithm to a plurality of least significant bits of said first binary number to obtain a third binary number, and for applying a block cipher to a fourth binary number, said fourth binary number comprising the concatenation of said second and third binary numbers, and said fourth binary number serving to authenticate any of said plurality of mobile subscriber units requesting communication with any of said plurality of base stations, wherein said second algorithm comprises a second simulated maximal-length shift register algorithm.

21. The cellular system of claim 20 wherein said system-wide time reference signal conveys to each of said plurality of base stations a measure of GPS time.

22. The cellular system of claim 20 wherein said first algorithm comprises a first simulated maximal-length shift register algorithm.

23. Each of the plurality of base stations of claim 20 wherein said first algorithm comprises a first pseudorandom noise generation algorithm.

24. Each of the plurality of base stations of claim 20 wherein said second algorithm inserts an all-zeroes value for said plurality of least significant bits once during the period of time necessary for the sequence of updates to produce a repeat value for said plurality of least significant bits.

25. Each of the plurality of base stations of claim 20 wherein the output of said first algorithm is never an all-zeroes value.

26. Each of the plurality of base stations of claim 20 wherein said most significant bits of said first binary number comprise the first 8 bits of said first binary number.

27. Each of the plurality of base stations of claim 20 wherein said fourth binary number is a 32-bit binary number.

28. Each of the plurality of base stations of claim 27 wherein said block cipher comprises a modified SKIPJACK block cipher.

29. Each of the plurality of base stations of claim 20 wherein said set of software instructions replace the most significant bits of said fourth binary number with the most significant bits of said concatenation when said most significant bits of said fourth binary number has an all-zeroes value.

30. A cellular base station comprising:
   means for applying a first algorithm to a plurality of most significant bits of a first binary number to obtain a second binary number;
   means for operating on a plurality of least significant bits of said first binary number with a second algorithm to obtain a third binary number;
   means for applying a block cipher to a fourth binary number, said fourth number comprising the concatenation of said second and third binary numbers; and
   means for replacing the most significant bits of said fourth binary number with the most significant bits of said concatenation when said most significant bits of said fourth number has an all-zeroes value.

31. The cellular base station of claim 30 wherein said first algorithm comprises a first simulated maximal-length shift register.

32. The cellular base station of claim 30 wherein said first algorithm comprises a first pseudorandom noise generation algorithm.

33. The cellular base station of claim 30 wherein said second algorithm comprises a second simulated maximal-length shift register algorithm.

34. The base station of claim 30 wherein said second algorithm comprises a second pseudorandom noise generation algorithm.

35. The base station of claim 30 wherein said second algorithm inserts an all-zeroes value for said plurality of least significant bits once during the period of time necessary for the sequence of updates to produce a repeat value for said plurality of least significant bits.

36. The base station of claim 30 wherein the output of said first algorithm is never an all-zeroes value.

37. The base station of claim 30 wherein said most significant bits of said first binary number comprise the first 8 bits of said first binary number.

38. The base station of claim 30 wherein said fourth binary number is 32-bit binary number.

39. The base station of claim 38 wherein said block cipher comprises a modified SKIPJACK block cipher.

40. A device comprising:
   means for applying a first algorithm to a plurality of most significant bits of a first binary number to obtain a second binary number;
   means for operating on a plurality of least significant bits of said first binary number with a second algorithm to obtain a third binary number;
   means for applying a block cipher to the concatenation of said second and third numbers to obtain said updated binary number, comprising:
      means for applying the block cipher to said concatenation to obtain an encrypted binary number;
      means for determining whether the most significant bits of said encrypted number has an all-zeroes value; and
      means for replacing, in response to said all-zeroes value, said most significant bits of said encrypted number with said most significant bits of said concatenation to obtain said updated binary number; and
   means for applying said updated binary number in cellular telephone system authentication procedures.

41. The device of claim 40 wherein means for applying the first algorithm comprises means for applying a first maximal-length shift register algorithm.

42. The device of claim 40 wherein means for applying the first algorithm comprises means for applying first pseudorandom noise generation algorithm.

43. The device of claim 40 wherein means for operating on the plurality of least significant bits of said first binary number with the second algorithm comprises means for operating on said plurality of least significant bits with a second maximal-length shift register algorithm.

44. The device of claim 40 wherein means for operating on the plurality of least significant bits of said first binary number with the second algorithm comprises means for operating on said plurality of least significant bits with a second pseudorandom noise generation algorithm.

45. The device of claim 40 wherein means for operating on the plurality of least significant bits of said first binary number with the second algorithm further comprises means for inserting an all-zeroes value for said plurality of least significant bits once during the period of time necessary for the sequence of updates to produce a repeat value for said plurality of least significant bits.

46. The device of claim 40 wherein the output of said first algorithm is never an all-zeroes value.

47. The device of claim 40 wherein said most significant bits of said first binary number comprise the first 8 bits of said first binary number.

48. The device of claim 40 wherein said updated binary number is a 32-bit binary number.

49. The device of claim 40 wherein said block cipher comprises a modified SKIPJACK block cipher.

* * * * *